(12) United States Patent
Stalker

(10) Patent No.: US 6,394,904 B1
(45) Date of Patent: May 28, 2002

(54) SIMULATION SYSTEM

(75) Inventor: David Stalker, Laguna Beach, CA (US)

(73) Assignee: Twentieth Century Fox Film, Los Angeles, CA (US)

( * ) Notice: Subject to any disclaimer, the term of this patent is extended or adjusted under 35 U.S.C. 154(b) by 0 days.

(21) Appl. No.: 09/569,933

(22) Filed: May 12, 2000

(51) Int. Cl.[7] .............................. A63B 13/00
(52) U.S. Cl. ..................... 463/23; 463/29; 463/36; 434/118
(58) Field of Search ..................... 463/23, 29, 36, 463/37, 38, 39; 434/128, 118

(56) References Cited

U.S. PATENT DOCUMENTS

| | | | | |
|---|---|---|---|---|
| 4,752,069 A | * | 6/1988 | Okada | 463/23 |
| 5,200,890 A | | 4/1993 | Pionchon | 364/410 |
| 5,554,033 A | * | 9/1996 | Bizzi et al. | 463/23 |
| 5,577,913 A | | 11/1996 | Moncrief et al. | 434/69 |
| 5,678,001 A | | 10/1997 | Nagel et al. | 395/173 |
| 5,929,844 A | * | 7/1999 | Barnes | 463/37 |
| 6,077,164 A | * | 6/2000 | Liu | 463/36 |
| 6,149,523 A | * | 11/2000 | Yamada et al. | 463/31 |
| 6,319,121 B1 | * | 11/2001 | Yamada et al. | 463/8 |

FOREIGN PATENT DOCUMENTS

EP 0 691 146 1/1996

* cited by examiner

Primary Examiner—Jessica J. Harrison
(74) Attorney, Agent, or Firm—Sheppard, Mullin, Richter & Hampton LLP; James R. Brueggemann

(57) ABSTRACT

An entertainment and/or training system providing a game-type system having two controllers, where the controllers have generally redundant controls. The controls can be limited on at least one of the controllers so as to provide one player with a simplified game to play. The person on the other controller then can act as a teacher, exclusively receiving some player input and exclusively providing some player output, so as to simplify the student's playing experience.

18 Claims, 3 Drawing Sheets

SIMULATION SYSTEM

Priority is claimed under 35 U.S.C. §119(e) from previously filed co-pending U.S. Provisional Application No. 60/133,706, filed May 12, 1999, which is herein incorporated by reference.

BACKGROUND OF THE INVENTION

This invention relates generally to training and entertainment systems and, more particularly, to a home or business game machine and simulation system, and to related methods of playing and training operators of simulation machines.

Video game machines are popular devices. New and innovative game designs are in constant demand, and these games are becoming increasingly complex in nature. Video game machines typically include a visual display, a user-input device, and a computerized processing system that controls the visual display in response to input from the input device and various parameters such as a programmed virtual environment. Video games may be designed for use by a single player, or several players. With more than one player, the players can be made to play either one at a time or simultaneously. Each player typically has one or more input devices, such as joy sticks, roller balls, buttons, or a wide variety of virtual reality type devices configured to sense the movement of the player's body. The visual device may be configured to provide a wide variety of information on the status of the game and the players' characters. Furthermore, it may include different information that is relevant to different players, and it may be configured such that different players are excluded from seeing particular information.

In multi-player game settings that have more than one player simultaneously acting, it is known that different players can have different input parameters. For example, in a Medieval dungeon-type game, one player might act as a swordsman that uses input devices for controlling his combat capabilities, while another player may act as a magician, using input devices to control magic spells that are cast. Such games may either require that groups of players be restricted to traveling together, or allow them to travel separately from the other players.

When dealing with more than one player, players will typically find that some players are of significantly higher skill level than others. It is known for game machines to compensate for variations in skill level by allowing players to select the level of difficulty for their own characters individually. Using this type of system, an inexperienced player can learn game skills by cooperating with more experienced players. However, the inexperienced player is still limited by his own capabilities of operating his input device or devices.

In some games that are designed for more than one player, a game entity, such as a tank, may have its functions divided between players. For example, in a tank game one player may operate the movement of a tank, while the other operates a gun turret.

As the number and experience level of the game playing public increases, video games are becoming of greater complexity. Often a player will have several input devices that will vary in use depending on the status of the character. For example, a joy stick that normally makes the player jump may instead make the player fly if the player's character is in possession of a particular game artifact.

As the complexities of video games increase, as the complexities of the input devices increase, and as the complexities of video displays increase, it becomes increasingly difficult for novice players to become expert at the operation of the games. One approach to overcoming this difficulty is for the machine to provide visual clues on a video monitor, where the clues suggest what the novice player should do with the input devices. However, this training method requires that the machine know what input decision the players should make. In complex games, it is rarely the case that there is one obviously superior choice.

Accordingly, there has existed a definite need for apparatus and methods for new game systems, and for training devices and methods of training video game players to use complex controls and/or interpret complex information from a video screen. The present invention satisfies these and other needs, and provides further related advantages.

SUMMARY OF THE INVENTION

The present invention provides a simulation system for entertainment and/or training, and related methods, to entertain and/or train a player in the use of a control system, such as that used in a game machine. It provides the benefit of using the skills and/or experience of another person to aid a player in learning the complexity of the control system, including both its controls and its user feedback mechanisms (e.g., its view screens and/or force-feedback systems) in a piecemeal fashion rather than requiring them to be learned all at once.

The simulation system typically includes a processing unit programed to provide a simulation of an entity to be influenced by one or more players under the influence of a plurality of simulation parameters. The system includes a first controller for use by a first player, where the first controller has one or more parameter controls, such as buttons, joysticks, and accelerometers. The first controller is configured for creating control signals readable by the processing unit to influence one or more of the plurality of simulation parameters. The system also includes a second controller for use by a second player, where the second controller has one or more parameter controls. The second controller is configured for creating control signals readable by the processing unit to influence the plurality of simulation parameters. The system also is configured with one or more training-rule controls for defining training rules. The training rules determine how the first controller's control signal influences the one or more of the plurality of simulation parameters.

The simulation system of the invention can include a program that defines character data and operational information on the running of a "game" that one or more "players" are to play, a player feedback system (such as a video monitor having a screen and/or a force-feedback system) for providing players with game information, input controls to allow the players to provide the game with input regarding certain parameters (e.g., the actions that a player is directing a game character to take), and a processor configured to implement the players' inputs during execution of the game, and to provide the game information to the player-feedback system.

The simulation system of the invention features a configuration wherein a trainer (e.g., a player taking a command role in the control of the game), using the second controller, can play with and/or train a student (e.g., a player accepting the trainer's command role in the control of the game), using the first controller, by easing the burden on the student of having complex controls and/or having to interpret complex player feedback. The burden is eased by having the trainer take over the task of controlling some controls and/or observing some player-feedback.

The training rules control which parameters the trainer is to assume (or share), and/or which game information is to be routed to the trainer and/or student. The simulation system features controls that provide for the programming of the training rules, such as by the trainer, the student, and/or the time, place or success level in the simulation.

Other features and advantages of the invention will become apparent from the following detailed description of the preferred embodiments, taken with the accompanying drawings, which illustrate, by way of example, the principles of the invention.

DETAILED DESCRIPTION OF THE PREFERRED EMBODIMENTS

Figure 1:
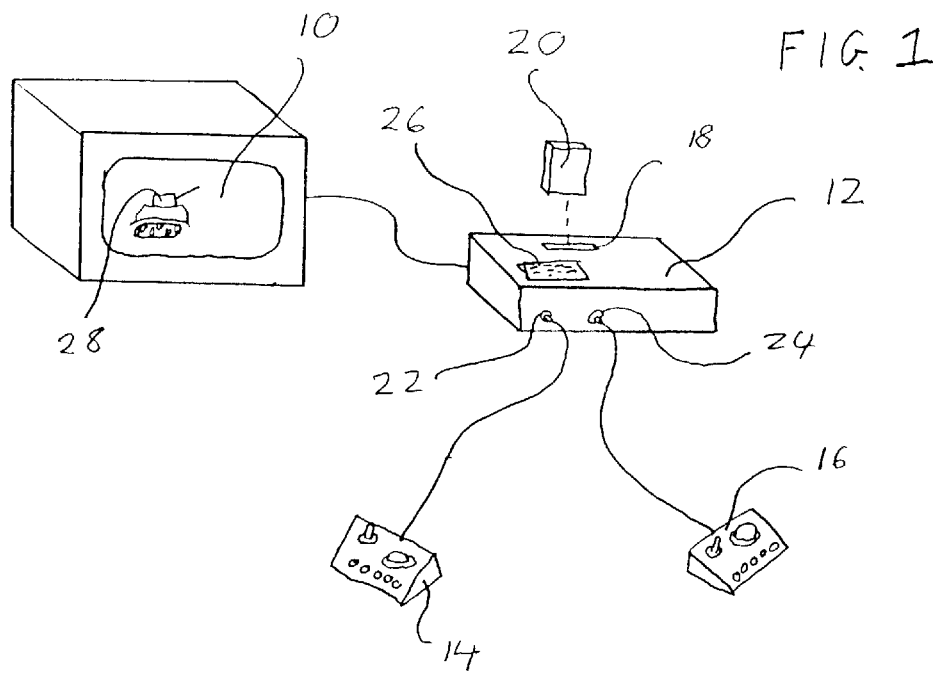
FIG. 1 is a perspective view of a simulation system embodying features of the present invention.

A simulation system for entertainment and/or training, according to the present invention, is shown in FIG. 1. The system includes a video screen 10, a processing unit 12, a first game controller 14, and a second game controller 16. The processing unit includes a port 18 configured to receive a game cartridge 20 that contains a game program and related game data, both preferably being stored in read only memory (ROM) within the game cartridge. In other potential embodiments the game program and game data could be provided on a compact disk, on a hard drive, in ROM, or over the Internet and stored in RAM.

The processing unit 12 is a typical computerized game device, containing a CPU with associated random-access memory (RAM), a typical video driver configured to drive the video screen 10, and input sockets 22, 24 for receiving input from the respective first and second game controllers 14, 16. The processing unit optionally may include controls 26, such as buttons, switches, or other such devices, which can be used to control the operation and/or configuration of the processing unit. The connections to the processing unit 12 alternatively could be wireless.

The game program in the game cartridge 20 contains software instructions instructing the processing unit 12 in receiving control signals with instructions from the game controllers 14, 16, and using the instructions to drive the video screen 10 such that a player using a game controller influences, and by that acts as, an entity such as a game character 28 in a game depicted on the video screen. The game can be any of a wide variety of presently known video games, or it can be any new video game that provides the characteristics, and controllable parameters of one or more game characters, and a virtual environment with which the game characters will interact. The entity in this context, is intended to include all (or most) parameters (i.e., the possible game variables that are directly influenced by a single player using controls on the game system).

For example, the entity could be individual, such as a race car having game parameters representing the input to a gas pedal, a brake and a steering wheel. Alternately, the entity could be a group, such as a party of dungeon explorers, having game parameters representing the movement of the party as a whole, and the fighting actions of each explorer. In yet another example, the entity could be a series of individuals, such as falling blocks that have game parameters representing the rotation and lateral translation of the blocks prior to their hitting the ground.

Figure 2:
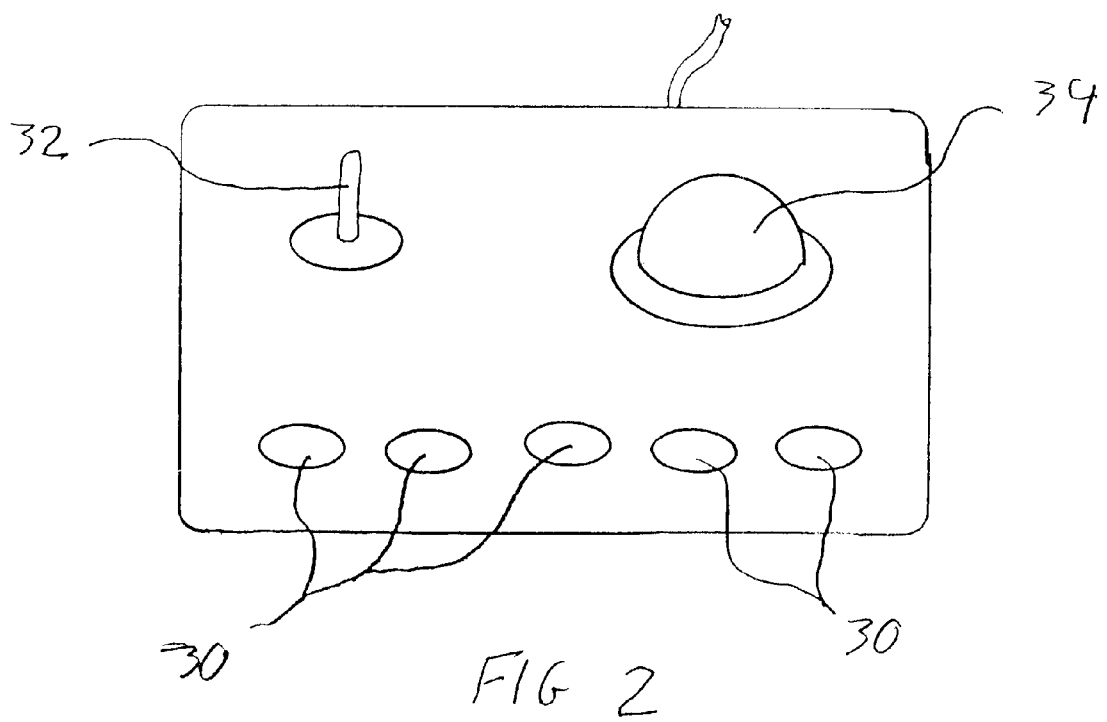
FIG. 2 is a plan view of a controller in the simulation system depicted in FIG. 1.

As seen in FIGS. 1 and 2, each game controller 14, 16 includes a group of one or more controls. The controls can be of many types, including buttons 30, joysticks 32, trackballs 34, and/or other typical computer or computer-game input devices such as accelerometers. For a given game, the controls are used to influence the parameters of a game character. The control can be configured to influence a single parameter, or it can be configured to influence several parameters. If it is configured to influence several parameters, this influence can be simultaneous, such as a joystick that can move in two degrees of freedom, or the influence can be alternating, such as a button that has different functions depending on the status of the game character in the game.

As an example of a number of controls being used to influence various parameters of a game character, consider a game character that is a tank. The joystick 32 could send signals to influence the tank's forward, reverse and turning movement, which would work appropriately so long as the tank was capable of that particular movement at the time. The trackball 34 could send signals to influence both the rotation of a gun turret and the elevation of a cannon on the gun turret. One button could influence firing of the cannon, a second button could influence reloading of the cannon, a third button could influence firing of a machine gun on the gun turret, and a fourth button could toggle the user between various viewscreens (e.g., a radar screen, an overhead view, and a targeting view). A fifth button, rather than serving to influence a parameter, could signal the processing unit 12 to pause the game and toggle into a mode for saving the game and/or adjusting game-wide parameters, such as difficulty level of the game. Once the game controller is in this mode, the other controls could be used for selecting the game-wide parameters.

The simulation system is preferably configured to support both single-player games and multi-player games. Furthermore, the multi-player games can be configured for alternating use by individual players, for simultaneous use by players, or even for alternating use by teams of simultaneous players. The simulation system may be configured to receive additional controllers, as might be needed for complex multiplayer games.

The simulation system of the invention is designed to be configured such that a (preferably) skilled player can function as a trainer, collaborator and/or competitor to a student player. The simulation system depicted in FIG. 1 can embody the present invention in a number of different ways, which depend upon the hardware and software provided in the processing unit 12, the game cartridge 20, and the game controllers 14, 16. Furthermore, other embodiments of the simulation system are within the scope of the invention, one of which will be discussed below with respect to FIG. 4.

Many of the different embodiments of the simulation system depicted in FIG. 1 provide for the student to operate one game controller, which will be assumed to be the first game controller 14, and the trainer to operate another game controller, which we will assume to be the second game controller 16, to jointly influence a game character's parameters. Other embodiments can provide for other game controller configurations.

The simulation system is preferably configured such that the influence on one or more parameters from the trainer's game character can be shared by and/or given to the student. This can be accomplished by either sharing the influence on the parameters (i.e., both the student and the trainer have an influence) or limiting the power to influence (e.g., the trainer gains the exclusive power to influence). In either case, the parameters, which are influenceable from controls on the second game controller in normal play (i.e., when the student is not working with a trainer) become influenceable from controls on the first game controller, which is operated by the student. Optionally, the system could be configured so that only the first controller could influence some parameters, as might be desired for a system designed for competitive sharing rather than simply training.

In these embodiments, the signals from the controls of each game controller can be combined into a composite signal (either analog or digital), or they can be carried as individual control signals on separate signal wires (or wireless communications channels). As is schematically described in FIG. 3, for all parameters that are to be influenceable by a trainer, the signals from the student's controls 60 are divided into student parameter signals 64 according to the parameters (or sets of parameters) that they represent. Likewise, signals from the trainer's controls 62 are divided into trainer parameter signals 66 according to the parameters (or sets of parameters) that they represent. Each student parameter signal and its related trainer parameter signal is then passed to a combining device 68.

The combining device 68 operates either by software, hardware, or other communications overlapping techniques to combine the corresponding signals according to one or more training rules of a training rule set and (preferably) form a parameter control signal 70 for controlling the particular parameter (or set of control parameters). The training rule set determines whether only the student parameter signal is used to form the parameter control signal, only the trainer's parameter signal is used to form the parameter control signal, or some combination of the two parameter signals are used to form the parameter control signal. These resulting control signals are used as game character inputs 72 for the game.

The training rules can also include rules to determine what occurs when contrary or similar signals are received from the two controllers within a limited period. For example, the student's controls could be ignored if they are contrary to the trainer. Likewise, contradictory control signals could cancel each other out.

During this combining, the combining device can optionally compare the student's and trainer's responses for shared parameters considered correct by some objective parameter. In this case, their responses can be scored against each other for competitive entertainment and/or training. Likewise, the student's responses can be scored against the trainer's, with the assumption that the trainer's responses are the correct response.

Figure 3:
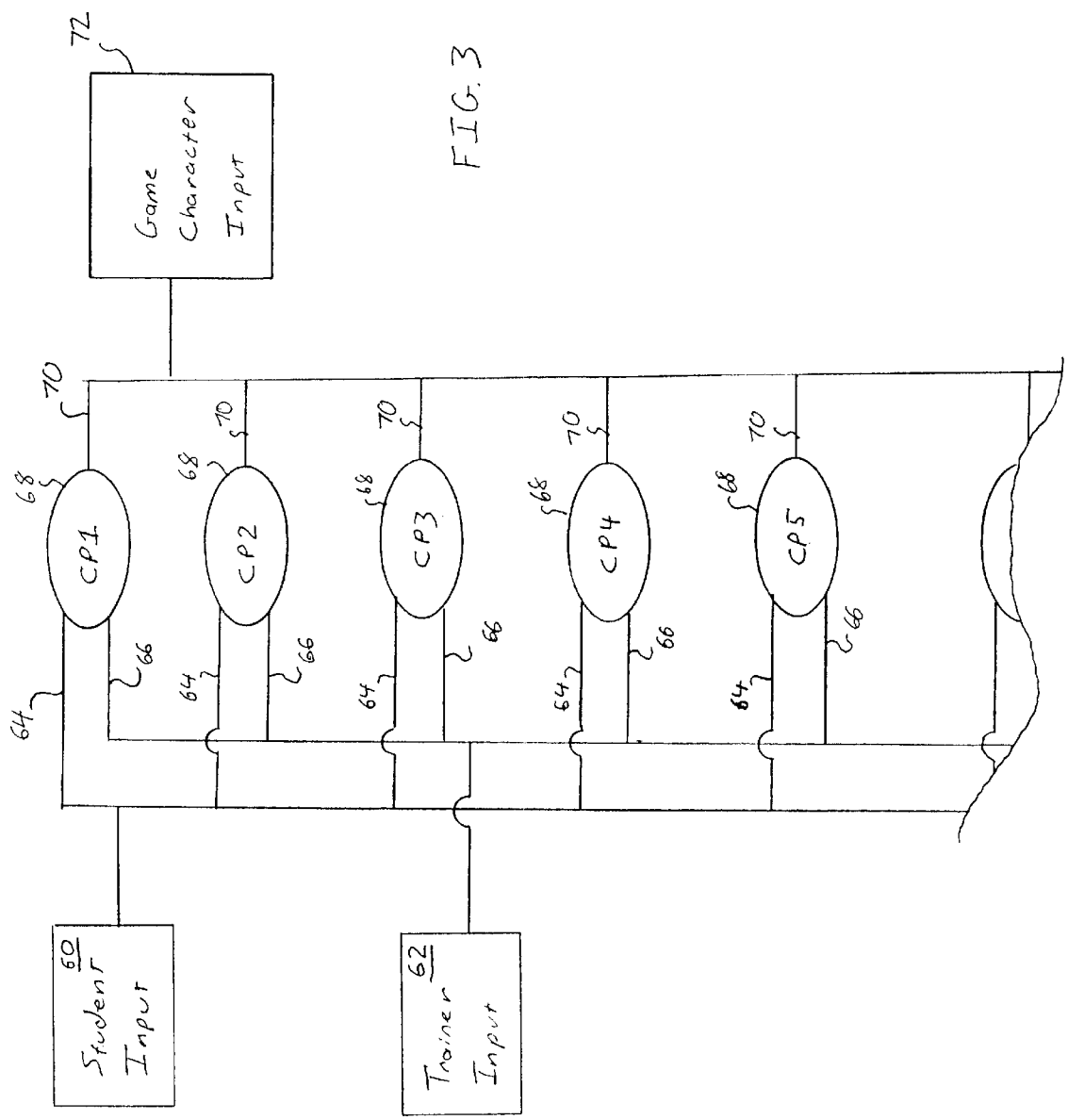
FIG. 3 is a schematic representation of a signal-combining portion of the simulation system depicted in FIG. 1.

The combining devices 68 can either be formed as hardware or software devices In the case of their being formed as hardware devices, the game character inputs 72 are preferably provided to registers that are accessible by a processor, within the processing unit 12, that controls the game. In the case of their being formed as software devices, parameter signals 64, 66 are preferably stored in registers accessed by a processor (or processors) that functions to combine the signals. It should be understood that the system depicted in FIG. 3 is exemplary, and the design of other systems is well within the capabilities of those skilled in the art.

Preferably, each controller 14, 16 is similar in layout, such that game play can be equally conducted on either controller by a player during normal play. This allows the transferred parameters to be influenced on similar controls as on the trainer's game controller.

The simulation system can be configured such that only one controller can serve as a trainer's controller, or it can be configured such that a trainer can use any controller to train a player. While it is within the scope of the invention to have the trainer operating an additional, separate game character in addition to some or all parameters of the student's game character, it is preferable for the trainer to only share the parameters of the students game character, thus allowing the trainer to provide the student with clear guidance and commentary during training.

As noted above, the simulation system depicted in FIG. 1 can describe a number of embodiments of the present invention. A number of these embodiments will be described below, using like reference numerals for like or similar components.

With reference to FIGS. 1–3, in a first embodiment of the present invention the processing unit controls 26 on the processing unit 12 provide the trainer and student with access to, and control over, the training rules used by the combining devices 68. For this embodiment, neither the game cartridge 20 nor the game controllers 14, 16 need be specially configured to be used for the training function.

In a second embodiment of the present invention, controls on one or more of the game controllers 14, 16 provide the trainer and/or the student with access to and control over the training rules used by the combining devices 68. The control is accessible when the processing unit 12 is toggled into the mode for saving the game and/or adjusting game parameters. In this case, the video screen is preferably used for indenting the status of the training rules, and for coordinating the training rule changes. For this embodiment, neither the game cartridge 20 nor the game controllers 14, 16 need be specially configured to be used for the training function.

A third embodiment of the present invention is configured similar to the second. However, rather than toggling the mode of the processing unit to change the training rules, particular controls on the game controllers 14, 16 are either dedicated to controlling the training rules, or scheduled to control the training rules at given intervals. These intervals can be either intervals in time or intervals in the progress of the game. For this embodiment, neither the game cartridge 20 nor the game controllers 14, 16 need be specially configured to be used for the training function. However, either the game and game controllers must allow for some controls to be dedicated to the training rules, or the game within the game cartridge must be specially configured to allow for the adjustment of training rules at the given intervals.

Figure 4:
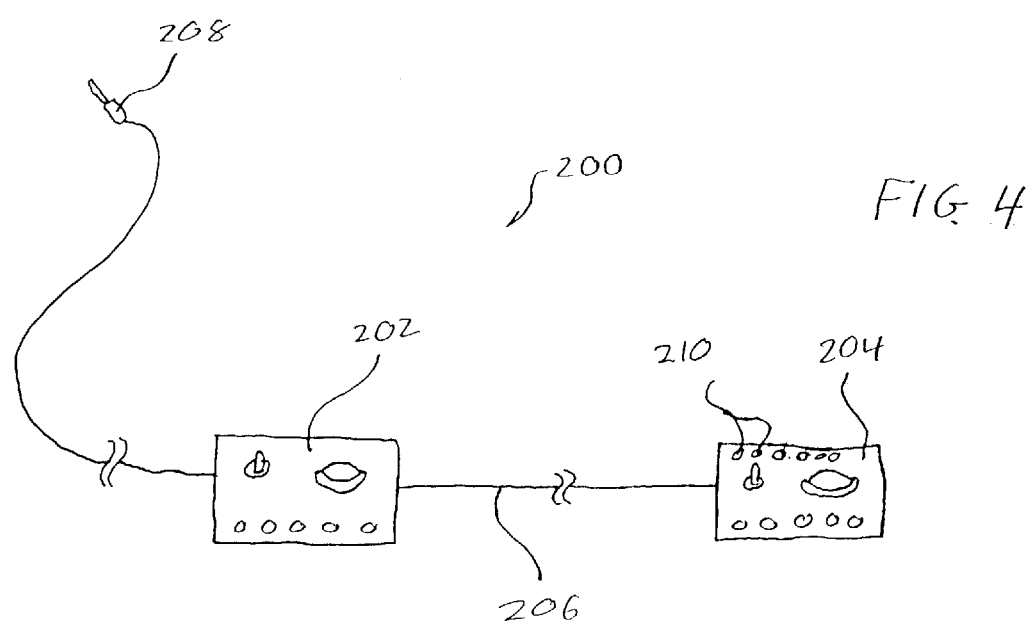
FIG. 4 is a plan view of a fourth embodiment of a simulation system game controller embodying features of the present invention.

With reference to FIGS. 3 and 4, in a fourth embodiment of the present invention, the first and second game controllers 14, 16 of the simulation system depicted in FIG. 1 are replaced with a single, training game controller 200. The training game controller preferably has a first group of controls located on a first control panel 202, and a second group of controls on a second control panel 204. The first and second groups of controls are preferably substantially similar in configuration, and are substantially similar to regular game controllers intended for use with the processing Eunit 12. A wire 206 connects the first and second control panels, which are wired to a plug 208 configured to be received in a socket on the processing unit.

As in the previous embodiments, the simulation system is configured such that the influence over one or more parameters from the student's game character can be shared and/or controlled by the trainer. In this embodiment, the training rules, which are used to control the selection of parameters to be influenced by the trainer, are determined by an additional set of rule-setting controls 210. These rule-setting controls can be located on a separate control panel on the first control panel 202, or most preferably, on the second control panel 204. The rule-setting controls preferably serve as hardware combining devices 68. However, they can either be formed as hardware or software devices. Also, while it is preferable that the entire rule-setting and signal combining functions are contained in the training game controller 200, some or all these functions could be shifted out into other portions of the simulation system, such as the processing unit 12.

As in the previous embodiments setting the training rules could result in either the sharing of the parameter's influence (i.e., both the student and the trainer have influence), or the transferring the parameter's influence (i.e., the trainer gains exclusive influence). In either case, the parameters, which are influenceable from controls on the first control panel 202 during normal play (i.e., when the student is not working with a trainer) become influenceable from controls on the second control panel 204, which is operated by the trainer.

While this embodiment of the simulation system is described and depicted with a given configuration of wires and control panels, it is to be understood that other configurations are within the scope of the invention. For example, while the depicted system is configured for the trainer to use the second control panel 204, it is within the scope of the invention for the trainer to use the first control panel 202. The plug 208 can be wired directly or indirectly to the above panels, or it can be replaced by a wireless connection.

For most variations of this embodiment, neither the game cartridge 20 nor the processing unit 12 need be specially configured to be used for the training function. Indeed, typical game controllers of the fourth embodiment can be used to provide the training function for video game designs that were not designed to incorporate the present invention. The trainer and student would simply replace a normal game controller with the training game controller.

A number of additional embodiments can be formed by designing the training rule setting and the signal combining functions in the control of the game cartridge 20. For example, the game cartridge could incorporate switches that serve to control the training rules. Additionally (or alternatively), the cartridge (or other game providing device such as CD, ROM, Hard Disk, Internet, etc.) could contain hardware and/or software that serve as the combining devices 68. Also, the game cartridge's game program, which is executed by the processing unit 12, could serve as a hardware or software combining device 68 in addition to its normal function in the execution of the game. For this last embodiment, the processing unit could access registers in the game cartridge to determine the training rules. Similar to the above-described fourth embodiment, many of these embodiments provide the training function for video game designs that were not designed to incorporate the present invention. The trainer and student would simply use a game cartridge that incorporates the present invention.

Further embodiments can be formed in systems that have separate user feedback systems (e.g., separate video screens and/or force-feedback systems) by having training rules that control which portions of the normal game information are provided to the student. For example, in a flight simulator the trainer could have the student view fundamental flight information on the player's video screen and feel vibration through the player's joystick, while the trainer could watch a long range radar on the trainer's video screen and not feel vibration through the trainer's joystick.

Yet further embodiments can be formed by having the training rules be pre-programmed into the simulation system such that they change over the duration of the training according to some predetermined plan.

While the above-described embodiments have included a particular game controller layout and configuration, the game controller of the invention is not limited to the one described above. Rather, it can be of a wide variety of configurations, either presently known or not-yet developed. Furthermore, while the game controllers have been described as separate devices, each being unitary, the controllers can alternatively be integrated into one panel, or can be further subdivided such that each controller includes a number of separate units. Indeed, depending on the game configuration, there may be parameters that overlap between game characters, such as the status of a given character's force field protecting several game characters, or such as the status of the view screen that is controlled by a character. Thus, there could be controls configured to influence parameters for more than one player.

Likewise, the configuration of the overall simulation system is not limited to the one described above. Instead, the entire system can be integrated into a single unit, such as in a typical video arcade type game. Furthermore, the system can have a wide variety of components, such as a series of individual players' view screens rather than a single view screen (as might be seen in a virtual reality game system). Indeed, while the game is described as using a view screen to provide game information to the players, the game information could be provided in other formats, such as with an audio system.

While a particular form of the invention has been illustrated and described, it will be apparent that various modifications can be made without departing from the spirit and scope of the invention. For example, the system could be configured such that a single trainer can control all or portions of numerous students player parameters. Thus, although the invention has been described in detail with reference only to the preferred embodiments, those having ordinary skill in the art will appreciate that various modifications can be made without departing from the invention. Accordingly, the invention is not intended to be limited by the described embodiments.

I claim:

1. An apparatus for a first player and a second player, comprising:
    a processing unit programed to provide a simulation of an entity to be influenced by one or more players via the influence of a plurality of simulation parameters;
    a first controller for use by the first player, the first controller having one or more parameter controls configured for creating control signals to influence one or more of the plurality of simulation parameters;
    a second controller for use by the second player, the second controller having one or more parameter controls configured for creating control signals to influence the plurality of simulation parameters;

one or more training-rule controls configured for defining training rules, the training rules determining how the first controller's control signal influences the one or more of the plurality of simulation parameters.

2. The apparatus of claim 1, wherein the first and second game controllers are hand held game controllers.

3. The apparatus of claim 1, wherein the first controller's one or more of the plurality of simulation parameters includes all of the plurality of simulation parameters.

4. The apparatus of claim 1, wherein the processing unit includes a port configured to receive a cartridge that contains a game program and related game data, and wherein the game program and related game data are used to program the processing unit to provide the simulation.

5. The apparatus of claim 1, wherein the processing unit receives control signals from the first controller to influence the one or more of the plurality of simulation parameters, wherein the processing unit receives control signals from the second controller to influence the plurality of simulation parameters, and wherein the processing unit applies the training rules to the first and second controllers' control signals to determine which of the one or more of the plurality of simulation parameters are allowed to be influenced by the first controller's parameter controls.

6. The apparatus of claim 5, wherein the one or more training-rule controls are on the processing unit.

7. The apparatus of claim 5, wherein the training controls and the training-rules are entirely determined by the programming of the processing unit.

8. The apparatus of claim 7, wherein the processing unit includes a port configured to receive a cartridge that contains a game program and related game data, and wherein the game program and related game data are used to program the processing unit to provide the simulation.

9. The apparatus of claim 1, wherein the first and second controllers are configured such that their signals are combined under the training rules into a composite signal that is provided to the processing unit.

10. The apparatus of claim 9, wherein the one or more training-rule controls are on the second game controller.

11. The apparatus of claim 1, wherein the one or more training-rule controls are dedicated to controlling the training rules.

12. The apparatus of claim 1, wherein the training rules always provide for the second controller's control signal to influence all of the plurality of simulation parameters.

13. The apparatus of claim 1, and further comprising a first user-feedback system configured to provide simulation information feedback to the first player and a second user-feedback system configured to provide simulation information feedback to the second player, wherein the training rules control which simulation information are provided to the first player.

14. The apparatus of claim 13, wherein the first and second feedback systems include video displays.

15. The apparatus of claim 13, wherein the first and second feedback systems include tactile systems.

16. A method for a first player and a second player to influence a programmed processing unit's simulation of an entity that responds to a plurality of simulation parameters, comprising:

generating a first control signal by the first player, the first control signal being configured to influence one or more of the plurality of simulation parameters;

generating a second control signal by the second player, the second control signal being configured to influence the plurality of simulation parameters; and applying one or more training rules to the first and second control signals to determine how the first control signal influences the one or more of the plurality of simulation parameters.

17. The apparatus of claim 16, wherein the step of applying one or more training rules comprises combining the first and second control signals under the training rules into a composite signal that is used to influence the plurality of simulation parameters.

18. An apparatus for a first player and a second player to influence a programmed processing unit's simulation of an entity that responds to a plurality of simulation parameters, comprising:

a means for generating a first control signal by the first player, the first control signal being configured to influence one or more of the plurality of simulation parameters;

a means for generating a second control signal by the second player, the second control signal being configured to influence the plurality of simulation parameters; and a means for applying one or more training rules to the first and second control signals to determine how the first control signal influences the one or more of the plurality of simulation parameters.

* * * * *

UNITED STATES PATENT AND TRADEMARK OFFICE
CERTIFICATE OF CORRECTION

PATENT NO. : 6,394,904 B1
DATED : May 28, 2002
INVENTOR(S) : David Stalker

It is certified that error appears in the above-identified patent and that said Letters Patent is hereby corrected as shown below:

Column 1,
Line 47, the following sentence should be inserted at the end of the paragraph -- The training rules can also determine how the second controller's signal influences the one or more of the plurality of simulation parameters --.

Column 6,
Line 40, "indenting" should be -- identifying --.

Column 7,
Line 2, "Eunit 12" should be -- unit 12 --.

Signed and Sealed this

Thirtieth Day of July, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,394,904 B1
DATED : May 28, 2002
INVENTOR(S) : David Stalker

Page 1 of 1

It is certified that error appears in the above-identified patent and that said Letters Patent is hereby corrected as shown below:

<u>Title page,</u>
Item [73], Assignee, "Twentieth Century Fox Film" should be -- Twentieth Century Fox Film Corporation --.

Signed and Sealed this

Twenty-ninth Day of April, 2003

JAMES E. ROGAN
*Director of the United States Patent and Trademark Office*